United States Patent
Monro

(10) Patent No.: US 7,813,573 B2
(45) Date of Patent: Oct. 12, 2010

(54) DATA CODING AND DECODING WITH REPLICATED MATCHING PURSUITS

(76) Inventor: Donald M. Monro, 6, The Lays, Goose Street, Beckington, Somerset BA11 6RS (GB)

( * ) Notice: Subject to any disclaimer, the term of this patent is extended or adjusted under 35 U.S.C. 154(b) by 768 days.

(21) Appl. No.: 11/222,667

(22) Filed: Sep. 8, 2005

(65) Prior Publication Data

US 2007/0053434 A1    Mar. 8, 2007

(51) Int. Cl.
| | |
|---|---|
| *G06K 9/36* | (2006.01) |
| *G06K 9/46* | (2006.01) |
| *H04N 7/12* | (2006.01) |
| *H04N 11/02* | (2006.01) |

(52) U.S. Cl. .................. 382/240; 375/240.19
(58) Field of Classification Search ........... None
    See application file for complete search history.

(56) References Cited

U.S. PATENT DOCUMENTS

| | | | |
|---|---|---|---|
| 5,315,670 A | | 5/1994 | Shapiro |
| 5,321,776 A | | 6/1994 | Shapiro |
| 5,412,741 A | | 5/1995 | Shapiro |
| 5,495,292 A | | 2/1996 | Zhang et al. |
| 5,585,852 A | | 12/1996 | Agarwal |
| 5,699,121 A | * | 12/1997 | Zakhor et al. ......... 375/240.17 |
| 5,768,437 A | | 6/1998 | Monro et al. |
| 6,078,619 A | | 6/2000 | Monro et al. |
| 6,148,106 A | * | 11/2000 | Impagliazzo .............. 382/224 |
| 6,532,265 B1 | | 3/2003 | Van der Auwera et al. |
| 6,556,719 B1 | | 4/2003 | Monro |
| 6,587,507 B1 | * | 7/2003 | Chui et al. ............. 375/240.19 |
| 6,614,847 B1 | | 9/2003 | Das et al. |
| 6,633,688 B1 | | 10/2003 | Nixon et al. |
| 6,741,739 B1 | | 5/2004 | Vincent |
| 6,757,437 B1 | | 6/2004 | Keith et al. |
| 6,782,132 B1 | | 8/2004 | Fogg |
| 6,795,504 B1 | | 9/2004 | Xu et al. |
| 6,982,742 B2 | * | 1/2006 | Adair et al. .................. 348/158 |
| 6,990,145 B2 | | 1/2006 | Monro et al. |
| 6,990,246 B1 | * | 1/2006 | Ferguson ..................... 382/240 |
| 7,003,039 B2 | | 2/2006 | Zakhor et al. |
| 7,006,567 B2 | * | 2/2006 | Frossard et al. ......... 375/240.03 |
| 7,242,812 B2 | | 7/2007 | Hwang et al. |

(Continued)

FOREIGN PATENT DOCUMENTS

| | | |
|---|---|---|
| WO | WO98/11730 | 3/1998 |

(Continued)

OTHER PUBLICATIONS

Marusic et al, "A Matching Pursuit Enhanced Three-Dimensional Wavelet Transform Coder", Electrotechnical Conference, 2000. MELECON 2000. 10th Mediterranean, Publication Date: 2000.vol. 2, On pp. 482-485.*

(Continued)

*Primary Examiner*—Yuzhen Ge
(74) *Attorney, Agent, or Firm*—Perkins Coie LLP

(57) ABSTRACT

Embodiments related to coding data using a motion compensated transform, and replicated matching pursuits are disclosed. In some embodiments, a motion compensated transform is applied to an original image sequence to produce a transformed image sequence, and a replicated matching pursuits process is performed on the motion compensated transformed image sequence to code it.

25 Claims, 9 Drawing Sheets

U.S. PATENT DOCUMENTS

| | | | |
|---|---|---|---|
| 7,336,811 | B2 | 2/2008 | Takeo |
| 7,436,884 | B2 | 10/2008 | Chen et al. |
| 7,447,631 | B2 | 11/2008 | Truman et al. |
| 7,548,656 | B2 | 6/2009 | Nakajima et al. |
| 2003/0103523 | A1* | 6/2003 | Frossard et al. ............. 370/465 |
| 2004/0028135 | A1 | 2/2004 | Monro |
| 2004/0126018 | A1 | 7/2004 | Monro |
| 2004/0165737 | A1 | 8/2004 | Monro |
| 2005/0084014 | A1* | 4/2005 | Wang et al. ............ 375/240.19 |
| 2006/0013312 | A1 | 1/2006 | Han |
| 2006/0146937 | A1 | 7/2006 | Ye et al. |
| 2006/0203906 | A1* | 9/2006 | Divorra Escoda et al. .................... 375/240.03 |
| 2006/0209963 | A1* | 9/2006 | Valente .................. 375/240.24 |
| 2007/0052558 | A1 | 3/2007 | Monro |
| 2007/0053434 | A1 | 3/2007 | Monro |
| 2007/0053597 | A1 | 3/2007 | Monro |
| 2007/0053603 | A1 | 3/2007 | Monro |
| 2007/0065034 | A1 | 3/2007 | Monro |
| 2007/0081593 | A1 | 4/2007 | Jeong et al. |

FOREIGN PATENT DOCUMENTS

| | | |
|---|---|---|
| WO | WO99/08449 | 2/1999 |
| WO | WO01/15456 | 3/2001 |
| WO | WO01/63935 | 8/2001 |
| WO | WO02/13538 | 2/2002 |
| WO | WO2005/027049 | 3/2005 |
| WO | WO 2005/119581 | 12/2005 |
| WO | WO 2007/030702 | 3/2007 |
| WO | WO 2007/030784 | 3/2007 |
| WO | WO 2007/030785 | 3/2007 |
| WO | WO 2007/030788 | 3/2007 |

OTHER PUBLICATIONS

Figueras et al., "Color Image Scalable Coding with Matching Pursuit" IEEE Int. Conference Acoustics Speech Signal Process, pp. III-53-56, May 2004.

Monro et al., "Improved Coding of Atoms in Matching Pursuits" IEEE Int. Conf. Image Process, vol. 2, Sep. 2003.

Frossard et al., "High Flexibility Scalable Image Coding" Proceedings of VCIP 2003, Jul. 2003.

Poh et al., "Comparison of Residual Compression Methods in Motion Compensated Video" IEEE Int. Workshop on Multimedia Signal Processing, pp. 109-112, Dec. 2002.

Moschetti et al., "New Dictionary and Fast Atom Searching Method for Matching Pursuit Representation of Displaced Frame Difference" IEEE International Conference on Image Processing, pp. III-685-688, Sep. 2002.

Neff et al., "Matching Pursuit Video Coding—Part I: Dictionary Approximation" IEEE Trans. Circuits System Video Technology, vol. 12, No. 1, pp. 13-26, Jan. 2002.

Tredwell et al., "A Sequential Vector Selection Algorithm for Controllable Bandwidth Motion Description Encoding" IEEE Sympos. Intell. Multimedia. Video & Speech Process, May 2001.

Czerepinski et al., "Matching Pursuits Video Coding: Dictionaries and Fast Implementation" IEEE Trans Circuit Systems Video Technology, vol. 10, No. 7, pp. 1103-1115, Oct. 2000.

Monro et al., "Visual Embedding of Wavelet Transform Coefficients" IEEE International Conference Image Process, pp. 186-189, Sep. 2000.

Neff et al., "Very Low Bit-Rate Video Coding Based on Matching Pursuits" IEEE Trans. Circuits and Systems for Video Tech., vol. 7, No. 1, pp. 158-171, Feb. 1997.

Mallat et al., "Matching Pursuits with Time-Frequency Dictionaries" IEEE Trans. Signal Processing, vol. 41, No. 12, pp. 3397-3415, Dec. 1993.

Steffen et al., "Theory of Regular $M$-band Wavelet Bases" IEEE Transactions on Signal Processing, vol. 41, No. 12, pp. 3497-3511, Dec. 1993.

Shapiro, "Embedded Image Coding Using Zerotrees of Wavelet Coefficients" IEEE Transactions on Signal Processing, vol. 41, No. 12, pp. 3445-3462, Dec. 1993.

Ramchandran et al., "Best Wavelet Packet Bases in a Rate-Distortion Sense" IEEE Transactions on Signal Processing, vol. 2, No. 2, pp. 160-175, Apr. 1993.

Mallat, "A Theory for Multiresolution Signal Decomposition: The Wavelet Representation" IEEE Trans. Pattern Anal. Mach. Intel., vol. 11, No. 7, Jul. 1989.

Daubechies, "Orthonormal Bases of Compactly Supported Wavelets" Comm. Pure Appl. Math., vol. 41, pp. 909-996, 1988.

R. Neff, A. Zakhor, and M. Vetterli, "Very low bit rate video coding using matching pursuits," Proc. SPIE Conf. on Visual Communication and Image Processing Chicago, IL, vol. 2308, pp. 47-60, Sep. 1994, 14 pages.

R. Neff and A. Zakhor, "Matching pursuit video coding at very low bit rates," IEEE Data Compression Conference, Mar. 1995, pp. 411-420, 10 pages.

Chou, Y., Hwang, W., and Huang, C. 2003. Gain-shape optimized dictionary for matching pursuit video coding. Signal Process. 83, 9 (Sep. 2003), 1937-1943, 7 pages.

Chan et al., "Multiple Description and Matching Pursuit Coding for Video Transmission Over the Internet," IEEE International Conference on Acoustics, Speech, and Signal Processing, Apr. 2003, vol. 3, pp. 425-428.

Monro et al., "Bases for Low Complexity Matching Pursuits Image Coding" www.http://dmsun4.bath.ac.uk.

Yuan et al., "Improved Matching Pursuits Image Coding" IEEE International Conference on Acoustics, Speech and Signal Processing ICASSP 2005, pp. II-201-204, Mar. 2005.

Monro, "Basis Picking for Matching Pursuits Image Coding" IEEE International Conference on Image Processing, pp. 2495-2498, Sep. 2004.

Yuan et al., "Low Complexity Separable Matching Pursuits" IEEE Int. Conference Acoustics Speech Signal Process, pp. III-725-728, May 2004.

U.S. Appl. No. 11/255,090, filed Oct. 19, 2005, Monro.

* cited by examiner

DATA CODING AND DECODING WITH REPLICATED MATCHING PURSUITS

FIELD

This application pertains to the field of coding data, and more particularly, to the field of coding images, video and/or audio data using motion compensated transforms and/or replicated matching pursuits.

BACKGROUND

Digital video and audio services such as transmitting digital images, video and/or audio information over wireless transmission networks, digital satellite services, streaming video and/or audio over the internet, delivering video content to personal digital assistants or cellular phones, etc., are increasing in popularity. Therefore data compression and decompression techniques that balance fidelity with levels of compression to allow efficient transmission and storage of digital content may be becoming more prevalent.

BRIEF DESCRIPTION OF THE DRAWINGS

The claimed subject matter will be understood more fully from the detailed description given below and from the accompanying drawings of embodiments which should not be taken to limit the claimed subject matter to the specific embodiments described, but are for explanation and understanding only.

Figure 1:
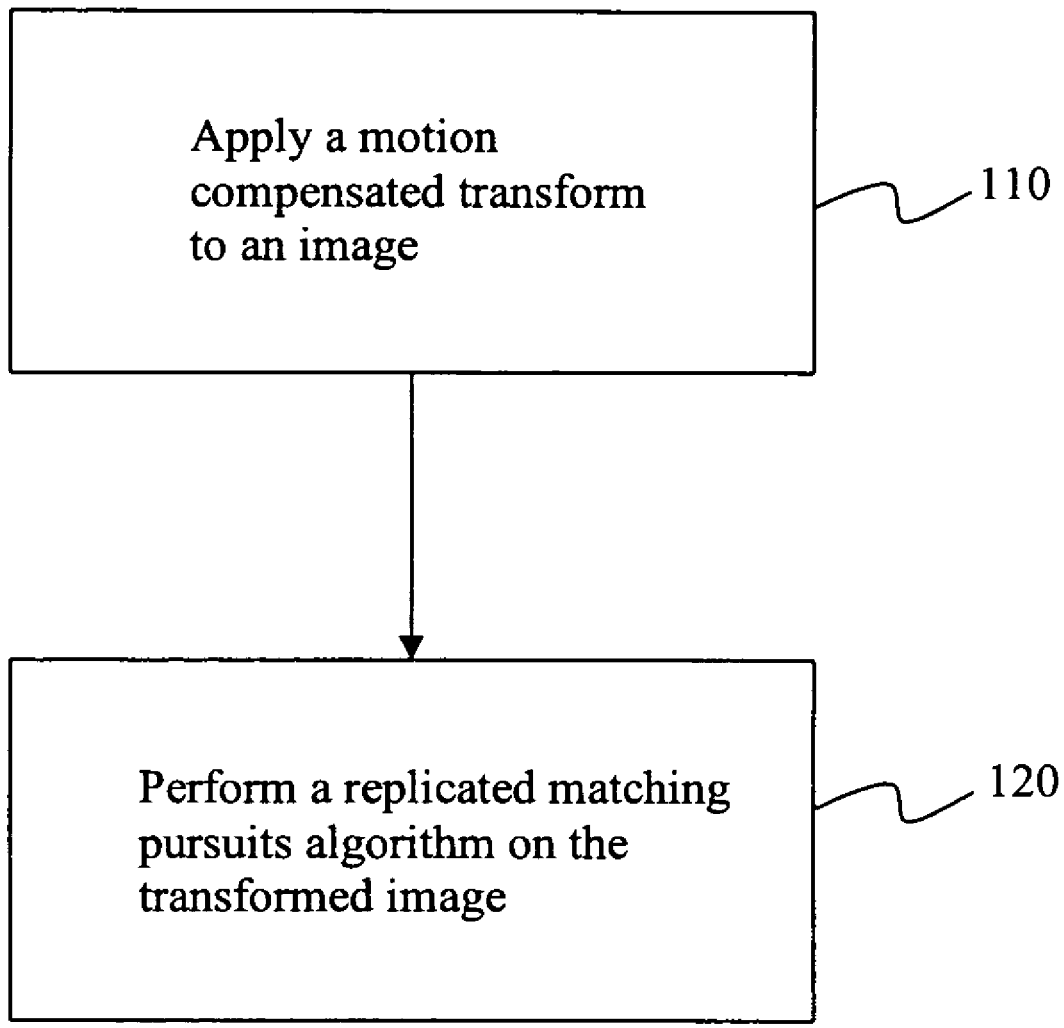
FIG. 1 is a flow diagram of one embodiment of a method for coding data, according to an embodiment.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

"Matching pursuits" processes may be used to compress digital images. A matching pursuits process may include finding a full inner product between a signal to be coded and each member of a dictionary of basis functions. At the position of the maximum inner product the dictionary entry giving the maximum inner product may describe the signal locally, and may be referred to as an "Atom." The amplitude is quantized, and the position, quantized amplitude, sign, and dictionary number form a code describing the Atom. For one embodiment, the quantization may be performed using a precision limited quantization method. Other embodiments may use other quantization techniques.

The Atom is subtracted from the signal giving a residual. The signal may then be completely described by the Atom plus the residual. The process may be repeated with new Atoms successively found and subtracted from the residual. At any stage, the signal may be described completely, or at least in part, by the codes of the Atoms found and the remaining residual. Furthermore, the coding process may be halted when a predetermined threshold is reached. The threshold may be, but are not limited to, percentage compression, number of Atoms, bit rate, and/or other threshold, and/or combinations thereof.

Matching pursuits may decompose any signal $f$ into a linear expansion of waveforms that may belong to a redundant dictionary $D=\phi\{\gamma\}$ of basis functions, such that $$f = \sum_{n=0}^{m-1} \alpha_n \varphi_{\gamma_n} + R^m f$$

where $R^m f$ is the $m^{th}$ order residual vector after approximating $f$ by m 'Atoms' and $$\alpha_n = \langle \varphi_{\gamma_n}, R^n f \rangle$$

is the maximum inner product at stage n of the dictionary with the $n^{th}$ order residual.

For some embodiments, the dictionary of basis functions may comprise two-dimensional bases. Other embodiments may use dictionaries comprising one-dimensional bases which may be applied separately to form two-dimensional bases. A dictionary of n basis functions in one dimension may provide a dictionary of $n^2$ basis functions in two dimensions, although the scope of the claimed subject matter is not limited in this respect.

For compression, the matching pursuits process may be terminated at some stage and the codes of a determined number of Atoms are stored and/or transmitted by a further coding process. For one embodiment, the further coding process may be a lossless coding process. Other embodiments may use other coding techniques, including some non-lossless processes.

An image may be represented as a two-dimensional array of coefficients, each coefficient representing intensity levels at a point. Many images have relatively smooth intensity variations, with the finer details being represented as sharper edges in between the smoother variations. The smoother variations in intensity may be termed as lower frequency components and the sharper variations as high frequency components. The lower frequency components (smoother variations) may comprise the gross information for an image, at least in part, and the higher frequency components may include information to add detail to the gross information. One technique for separating the low frequency components from the high frequency components may include a Discrete Wavelet Transform (DWT). Wavelet transforms may be used to decompose images. One type of DWT may be a three-dimensional DWT with motion compensation. This transform may refer to predetermined motion vectors in order to produced transformed information. The other transformed information may be in a form that matching pursuits may be applied to, to achieve a higher compression ratio and better fidelity than either of the transforms separately.

Figure 5:
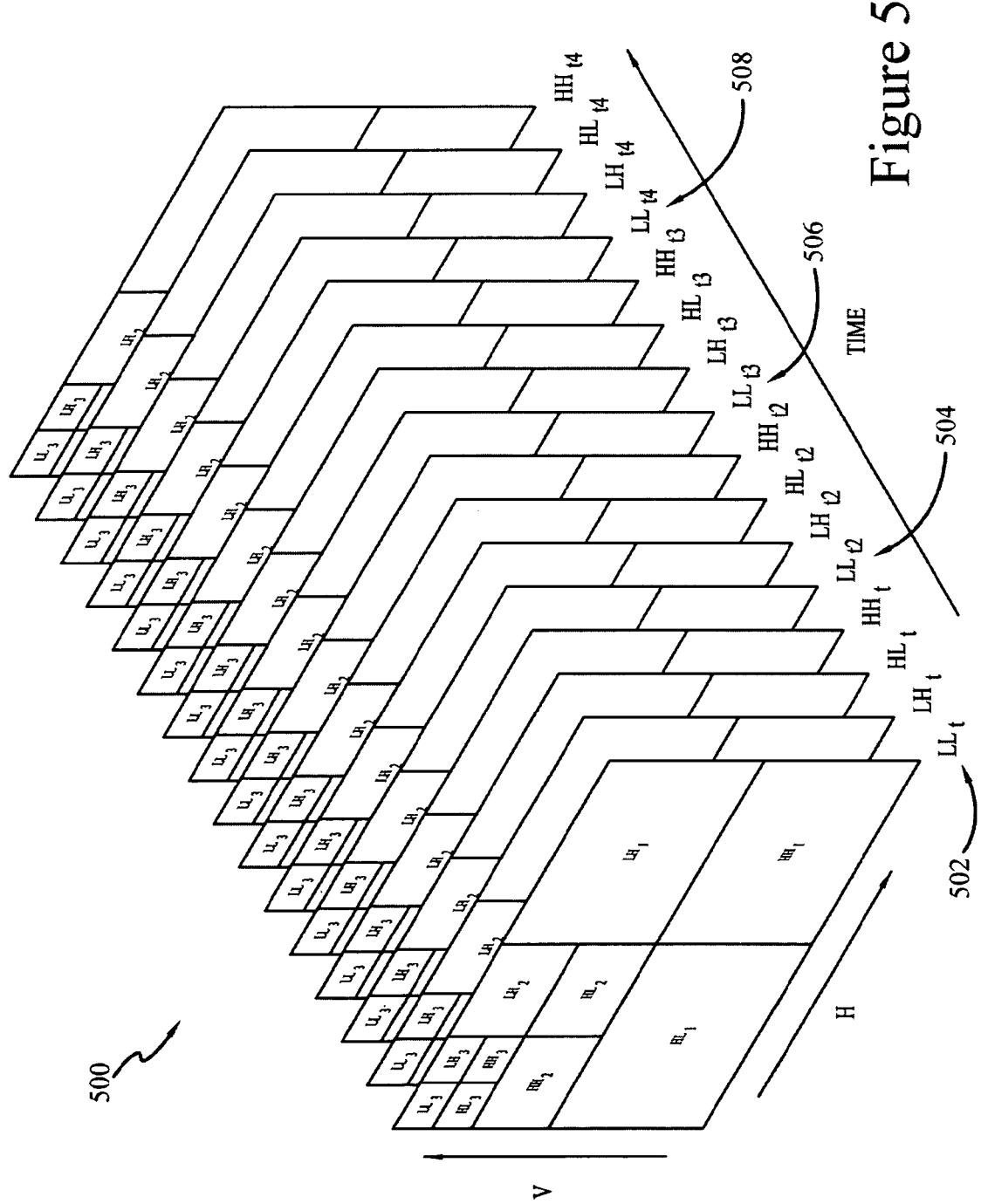
FIG. 5 is a diagram depicting a group of temporal planes, according to an embodiment.

Wavelet decomposition may include the application of Finite Impulse Response (FIR) filters to separate image data into sub sampled frequency bands. The application of the FIR filters may occur in an iterative fashion, for example as described below in connection with FIGS. 3a through 3d. Furthermore, the data may be filtered in the temporal direction to form different temporal planes that have been filtered similarly, as shown in FIG. 5.

FIG. 1 is a flow diagram of one embodiment of a method for coding an image. At block 110, a motion compensated transform is applied to an image. Transform may be a three-dimensional motion compensated wavelet transform of other transform. At block 120, a replicated matching pursuits process is performed on the transformed image. The combination of the motion compensated and/or other transform, and the matching pursuits process may result in a more efficient compression of the image data. The example embodiment of FIG. 1 may include all, more than all, and/or less than all of blocks 110-120, and furthermore the order of blocks 110-120 is merely an example order, and the scope of the claimed subject matter is not limited in this respect.

The extension of the 2D wavelet transform into the temporal direction to form a 3D spatio-temporal transform for video may be accomplished. Applying a temporal transform over n scales separately, along with the 2D spatial one may result in a temporal decomposition into groups of $2^n$ planes, one or more of which may correspond to a particular combination of lower and higher pass temporal filterings. These temporal planes may be somewhat analogous to the sub-bands of the 2D transform.

Figure 2:
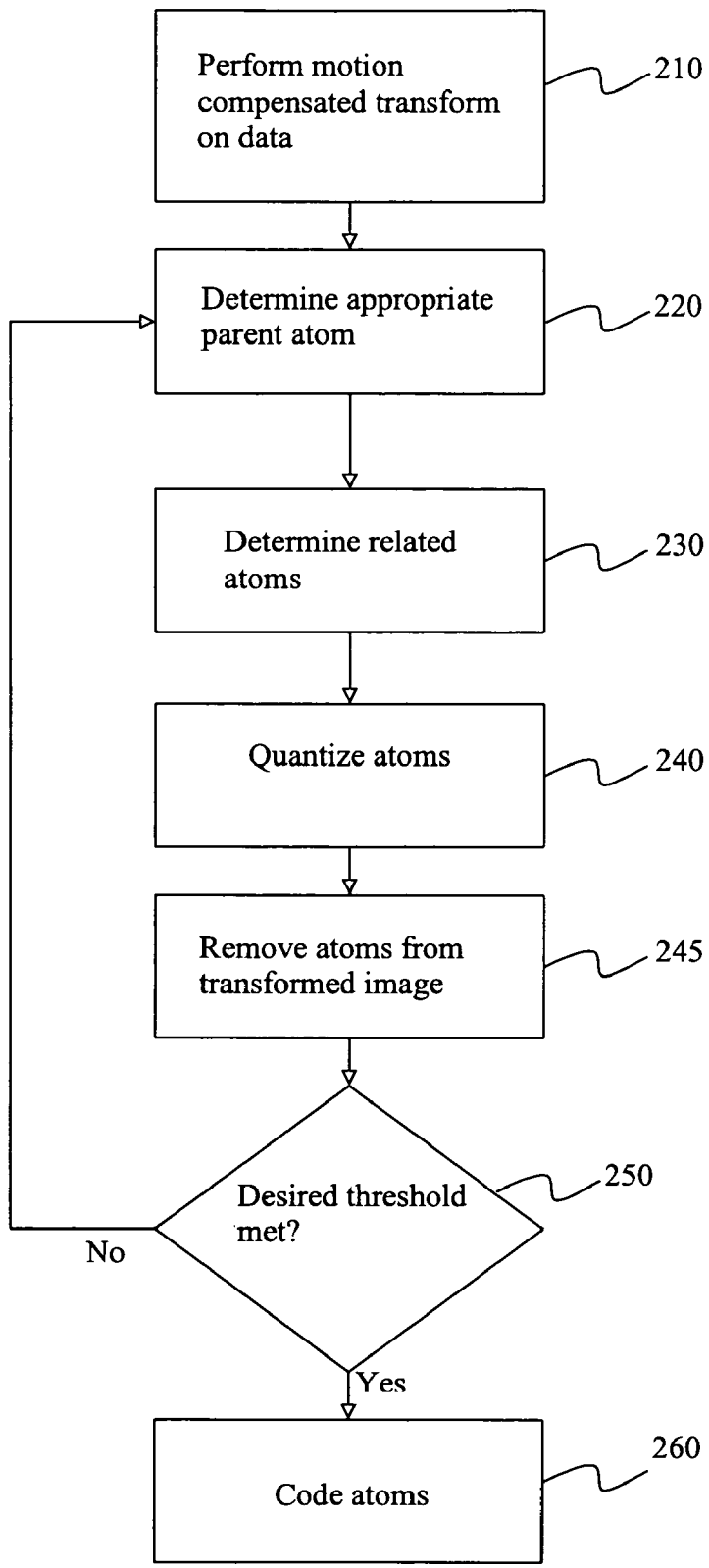
FIG. 2 is a flow diagram of one embodiment of a method for coding data using a motion compensated transform, and replicated matching pursuits.

FIG. 2 is a flow diagram of one embodiment of a method for coding an image using a motion compensated transform and matching pursuits. At block 210, a motion compensated transform is performed on an image. The image may comprise a still image (or intra-frame), a motion-compensated residual image (Displaced Frame Difference (DFD) image, or inter-frame), or other type of image or data. The transform for this example embodiment may comprise a three-dimensional analysis with motion compensation, although the claimed subject matter is not limited in this respect. The analysis or decomposition may be carried out for some embodiments a number of times, yielding a hierarchical structure of bands, and temporal planes. Three-dimensional motion compensated discrete wavelet transformation is discussed further below in connection with FIG. 3a through FIG. 7.

At block 220, a replicated matching pursuits process begins. For this example embodiment, the matching pursuits process comprises blocks 220 through 250. At block 220, an appropriate parent Atom is determined. The appropriate parent Atom may be determined by finding the full inner product between the transformed image data and each member of a dictionary of basis functions. At the position of maximum inner product the corresponding dictionary entry may describe the wavelet transformed image data locally. The dictionary entry forms part of the Atom. An Atom may comprise a position value, the quantized amplitude, sign, and a dictionary entry value. Once the parent atom is determined, similar related Atoms, called child Atoms, may be determined. These child Atoms may be determined from temporal planes that may include similar information and/or similarly transformed data.

At block 240, the parent and child Atoms may be quantized. The child Atoms may be estimated to be the same, or nearly the same, amplitude as the parent, may be determined, and/or may be set to null if the amplitude is relatively small when compared to the parent, and/or combinations thereof. Quantization for the Atoms may be accomplished via precision limited quantization (PLQ) or other quantization technique.

At block 245, the Atoms determined at block 220 and 230 and quantized at block 240 is removed from the wavelet transformed image data, producing a residual. The wavelet-transformed image may be described by the Atoms and the residual.

At block 250, a determination is made as to whether a desired threshold has been met. The desired threshold may include, but not limited to, a certain number of Atoms, bit rate, compression ratio, image quality, and/or other threshold among many other considerations and/or limitations. If the desired threshold has not been reached, processing returns to block 220 where another Atom is determined from the residual.

The process of selecting an appropriate Atom may include finding the full inner product between the residual of the wavelet transformed image after the removal of the prior Atom, and the members of the dictionary of basis functions. In another embodiment, rather than recalculating all of the inner products, the inner products from a region of the residual surrounding the previous Atom position may be calculated.

Blocks 220 through 250 may be repeated until the desired threshold has been reached. Once the desired threshold has been reached, the Atoms are coded at block 260. The Atoms may be coded by any of a wide range of encoding techniques. The example embodiment of FIG. 2 may include all, more than all, and/or less than all of blocks 210-260, and furthermore the order of blocks 210-260 is merely an example order, and the scope of the claimed subject matter is not limited in this respect.

Figure 3A:
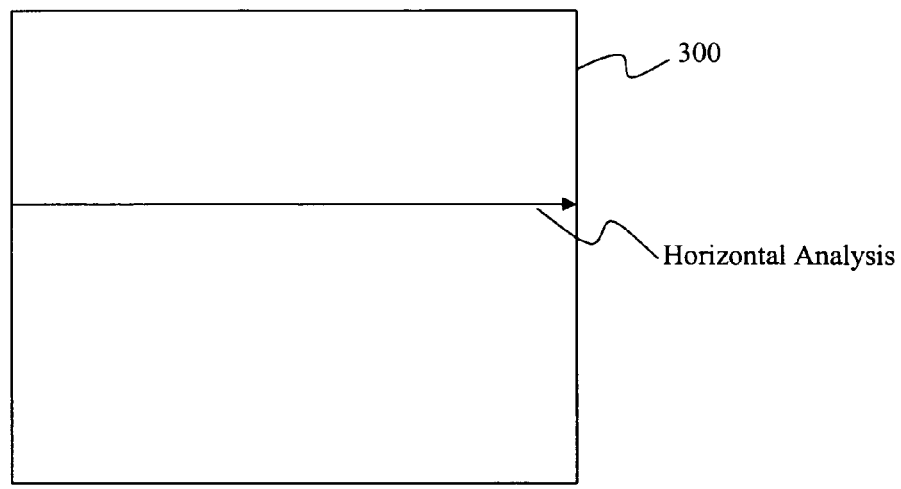
FIG. 3a is a diagram depicting an example decomposition of an image in a horizontal direction.
Figure 3B:
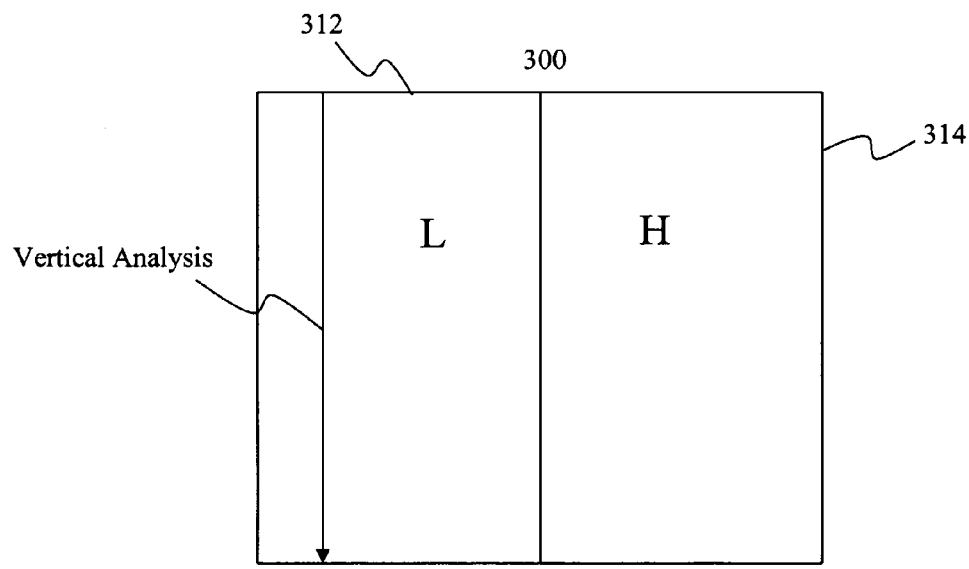
FIG. 3b is a diagram depicting an image that has been decomposed in a horizontal direction and is undergoing decomposition in a vertical direction.

FIGS. 3a through 3d is a diagram depicting an example wavelet decomposition of an image 300. As depicted in FIG. 3a, for this example embodiment, the analysis begins in a horizontal direction. Other embodiments may begin the analysis in a vertical direction, or in another direction. The horizontal analysis results in the image data being subdivided into two sub bands. The resulting lower pass band (containing lower frequency image information) is depicted as area 312 in FIG. 3b and the high pass sub band (containing high frequency image information) is depicted as area 314. Also as depicted in FIG. 3b, an analysis is performed in a vertical direction on image 300.

Figure 3C:
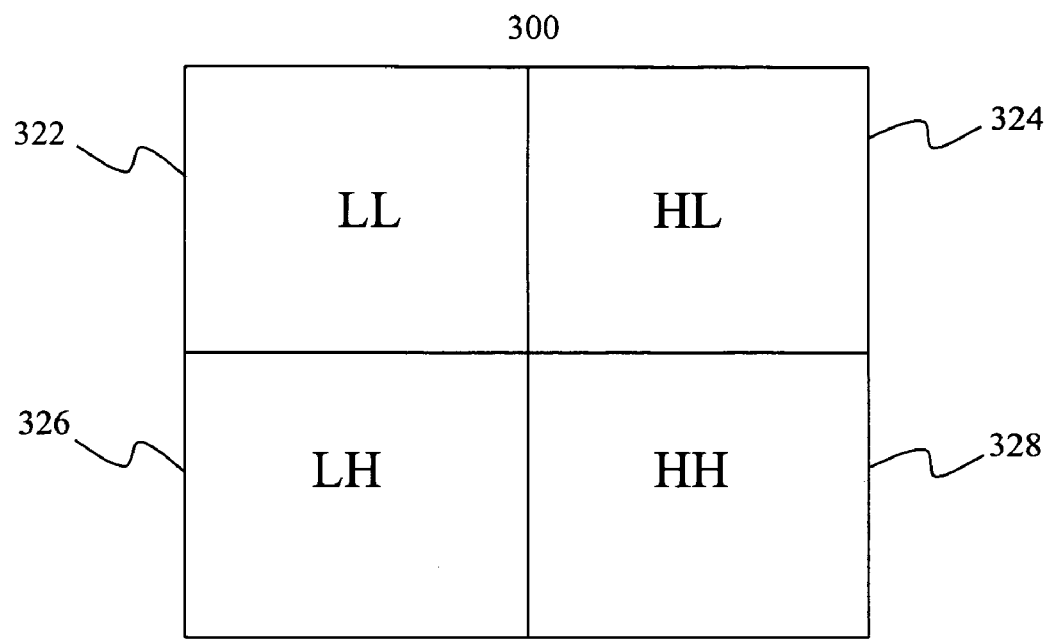
FIG. 3c is a diagram depicting an image that has been decomposed into four frequency bands.

FIG. 3c shows the results of the horizontal and vertical analyses. Image 300 is divided into four sub bands. LL sub band 322 includes data that has been low pass filtered in both the horizontal and vertical directions. HL sub band 324 includes data that has been high pass filtered in the horizontal direction and low pass filtered in the vertical direction. LH sub band 326 includes data that has been low pass filtered in the horizontal direction and high pass filtered in the vertical direction. HH sub band 328 includes data that has been high pass filtered in both the horizontal and vertical directions. LL sub band 322 may include gross image information, and bands HL 324, LH 326, and HH 328 may include high frequency information providing additional image detail.

Figure 3D:
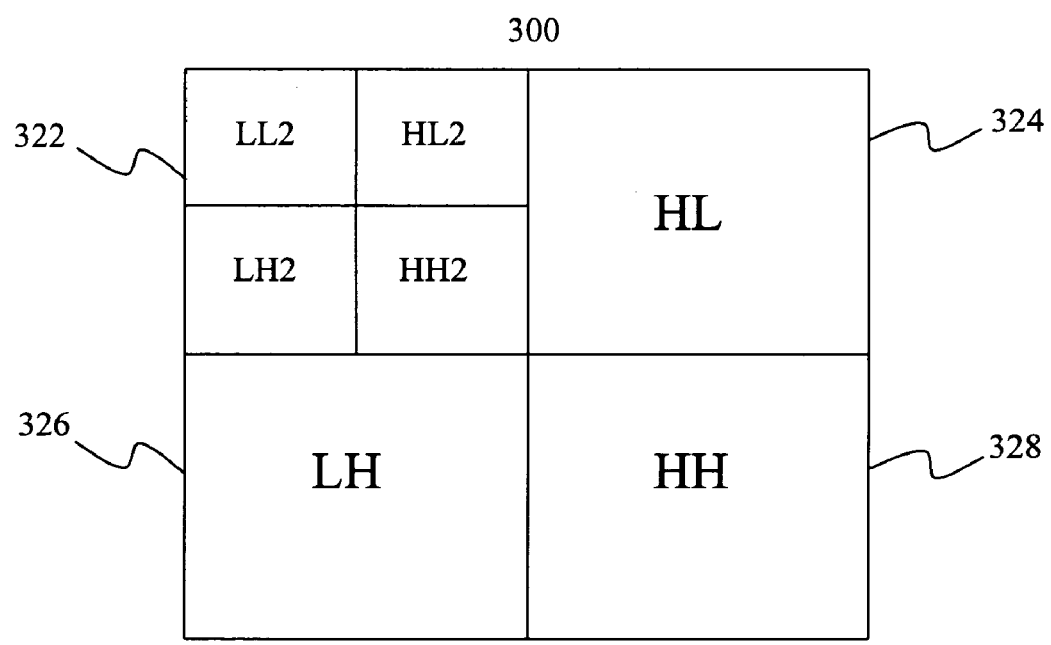
FIG. 3d is a diagram depicting an image that has been decomposed into four frequency bands where one of the bands has been decomposed into four additional bands.

For wavelet transformation, benefits may be obtained by repeating the decomposition process one or more times. For example, LL band 322 may be further decomposed to produce another level of sub bands LL2, HL2, LH2, and HH2, as depicted in FIG. 3d. A level of decomposition may be referred to as a wavelet scale. Thus, image 300 of FIG. 4d can be said to have undergone wavelet transformation over two scales. Other embodiments may include wavelet transformation over different numbers of scales. For example, in one embodiment, for still images or intra-frames a wavelet transformation may be performed over five scales, and for DFD images a wavelet transformation may be performed over two scales.

FIGS. 3a through 3d depict an example embodiment of a two band (lower and higher) wavelet transformation process. Other embodiments are possible using more than two bands.

Figures 4A, 4B:
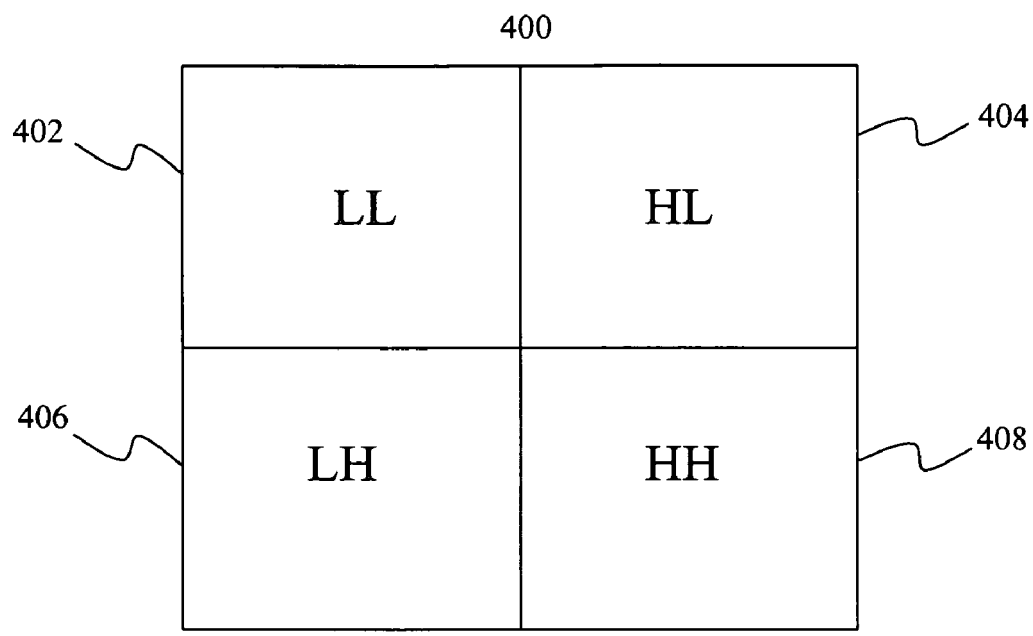
FIG. 4a is a diagram depicting an image that has been decomposed into four frequency bands.
FIG. 4b is a diagram depicting the image of FIG. 6a where the four frequency bands have each been decomposed into four frequency bands.

Another possible embodiment for wavelet transformation may be referred to as wavelet packets. FIGS. 4a and 4b depict one possibility for wavelet packets. In FIG. 4a, an image 400 has undergone a single scale of two band decomposition in a manner similar to that discussed above in connection with FIGS. 3a through 3c, yielding LL sub band 402, HL sub band 404, LH sub band 406, and HH sub band 408. For this example embodiment, one or more of the sub bands 402 through 408 are further decomposed into four sub bands, as depicted in FIG. 4b. LL sub band 402 is decomposed into sub bands LLLL, LLHL, LLLH, and LLHH. HL sub band 404 is decomposed into sub bands HLLL, HLHL, HLLH, and HLHH. LH sub band 406 is decomposed into sub bands LHLL, LHHL, LHLH, and LHHH. HH sub band 408 is decomposed into sub bands HHLL, HHHL, HHLH, and HHHH. For some embodiments, any of all of the sub bands depicted in FIG. 4b may be further decomposed into additional levels of sub bands. Further, although the example embodiment of FIGS. 4a and 4b utilize two band decomposition, other embodiments may use additional numbers of bands.

FIG. 5 shows a 3 scale spatial (in the horizontal H, and the vertical V directions) and 4 separate 2 scale temporal transforms at 500, according to one embodiment. As shown, the 4 separate 2 scale temporal transforms of four images are utilized to create a group of 16 temporal planes. One aspect of this group of temporal planes is that similarly transformed planes may occur periodically. Other numbers of transforms and planes, such as but not limited to, 1 or more spatial scales, and 1 or more scales of 2 or more temporal wavelet transforms, may be utilized without straying from the concepts disclosed herein.

In an embodiment, the first plane from the left has been transformed $LL_{t}$ 502 and the fifth plane has been transformed $LL_{t2}$ 504, the $9^{th}$ $L_{t3}$ 506, and the $13^{th}$ $LL_{t4}$ 508. These planes may have been transformed by a low filter twice. Therefore, as the planes have been transformed similarly both spatially and temporally, similar information may be found in similar locations of the periodic planes. Once a parent atom is found in one of the planes, a child atom may likely be found in a similarly temporally transformed plane. In the embodiment shown in FIG. 5, whenever one atom is found and coded, it is possible to check whether up to three similar Atoms can be similarly coded.

In an embodiment the entire group of 16 temporal planes may be searched for the best single 2D Atom. Each Atom found may be called a parent Atom, and the three associated Atoms are called child Atoms. In an embodiment, run length may coding may code the occurrence of replicated atoms. There may be many other ways of selecting and coding the replicated atoms. One aspect is the realization that in a group of temporal planes (GOTP), after a 3D motion compensated wavelet transform, or another transform, there are corresponding planes in which it can be expected to find similar atoms, thereby giving a gain in compression by providing an improved image approximation at reduced computational and/or other cost.

In such an embodiment shown in FIG. 5, similarly transformed planes are found every $4^{th}$ plane. Other intervals may be possible. Furthermore, as some planes are transformed once high and once low, in different orders, more than three similar Atoms may be found from similarly transformed planes. Furthermore, although a group of 16 temporal planes are shown, other number of planes may be utilized with this method, without straying from the concepts disclosed herein.

Figure 6:
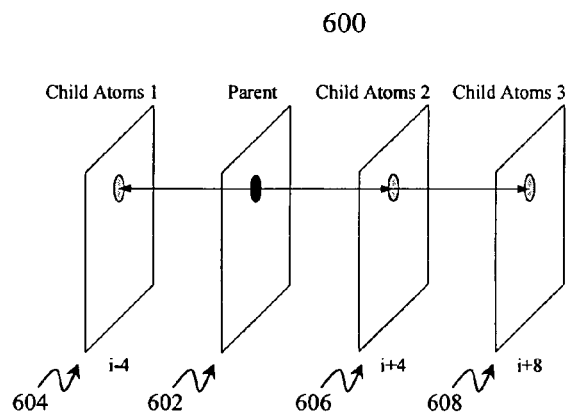
FIG. 6 is a diagram depicting planes in which similar atoms may be found, according to an embodiment.

FIG. 6 shows a selection of planes from a group of temporal planes. As described above, the parent Atom is found in plane i 602, then every forth plane i−4 604, i+4 606, i+8 608 is checked to see if a similar, or child atom, may be found in a similar area of a similarly transformed plane.

Figure 7:
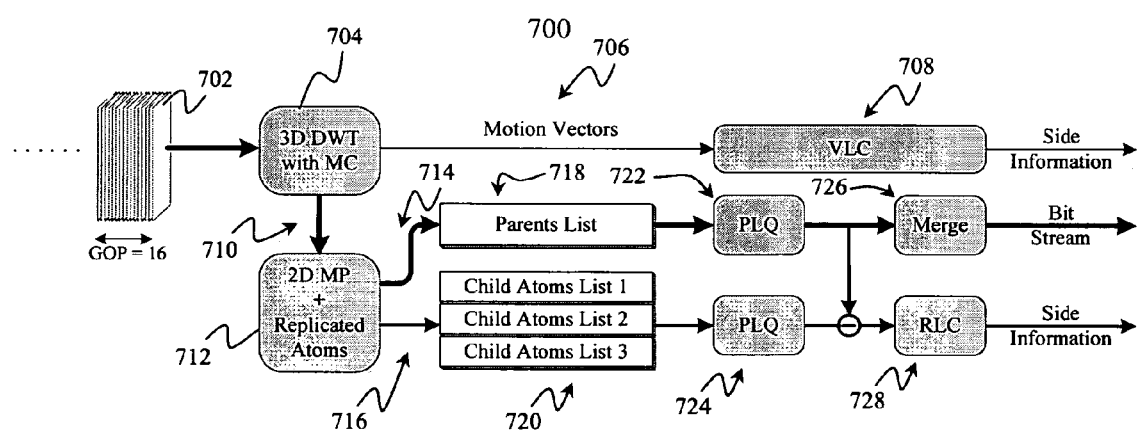
FIG. 7 is a block diagram of an embodiment of an example coding system.

FIG. 7 is a block diagram of one embodiment of an example video coding system 700. Coding system 700 may be included in any of a wide range of electronic devices, including digital cameras or other image forming devices, although the claimed subject matter is not limited in this respect. Coding system 700 may receive a group of temporal planes 702 for a current original image equence. For this example embodiment, the current original image may be a group of temporal planes (GOTP). For this example embodiment, the GOTP image data is processed by a motion estimation and 3-dimensional discrete wavelet transform with motion compensation block 704. 3-dimensional discrete wavelet transform with motion compensation block 704 may produce motion vectors 706 which may be encoded as side information by a variable length coding (VLC) block 708. Alternatively, motion vectors may be found and fed into 3-dimensional discrete wavelet transform with motion compensation block 704.

Planes of DWT coefficients 710 are received at a replicated matching pursuits block 712. Replicated matching pursuits transform block 712 may perform a replicated matching pursuits transform, plane by plane, on planes of DWT coefficients 710. A 2D Atom from the GOTP with the largest inner product may be selected as the parent Atom. It may be represented by, the dictionary entry, amplitude, sign, and location within a particular plane, and other coordinates and values. Other similar planes are then searched, in a similar area, for similar child Atoms.

The child Atom estimation may not be optimal as there may be another dictionary entry that would better describe the child Atom. However, if the amplitude of the child Atom is large enough, it may be selected for replication, otherwise the child Atom may be coded as null.

The descriptions of the parent Atoms 714 are sent to the parent Atoms list 718. Similarly the descriptions of the child Atoms 716 are sent to the child Atoms list 720. The GOTP may be updated by subtracting the parent and children Atoms. The process is repeated until a predetermined threshold is met. The predetermined threshold may be a bit rate, compression ratio, maximum number of Atom, and/or other threshold, and/or combinations thereof.

The transform may be similar to one or more of the example embodiments discussed above in connection with FIGS. 1 through 6, although the claimed subject matter is not limited in this respect. Furthermore, the replicated matching pursuits process may be implemented in a manner similar to that discussed above in connection with FIG. 2, although the claimed subject matter is not limited in this respect. The matching pursuits process may use a dictionary (not shown) to construct a series of Atom parameters which are used to describe the Atom.

The Parent Atoms list 718 and the child Atoms list 720 may then be coded by precision limited quantization blocks 722 and 724 respectively. The 2D Parent atoms may be quantized by Precision Limited Coding (PLQ) at PL=2, which may give the best PSNR at given bit rate in MERGE coding of 2D Atoms. As a result of experimentation, the accuracy of the child Atoms may be sacrificed to reduce the bit cost of coding them, so they are quantized at PL=1, meaning that their amplitude is specified only by the FSB. Because the parent may have the largest amplitude over the whole GOTP, its child atoms may only have smaller amplitudes and are coded as the difference in FSB from the Parent, ΔFSB, which is restricted in range and defined as:

$$\begin{aligned} &\text{if}(FSB_{Parent} - FSB_{Children} \leq \text{Threshold}) \\ &\quad \Delta FSB = FSB_{Parent} - FSB_{Children}; \\ &\text{else} \\ &\quad \Delta FSB = \text{Null}; \\ &\text{end} \end{aligned}$$

In the embodiment described, the embedded MERGE coder block 726 may be used to code the parent Atoms. They are collected into groups by FSB, R and Basis Dictionary number. For each group the positions of the atoms in the wavelet coefficient space are signaled by run length coding (RLC) block 728 using a particular scanning order of the coefficients in each plane, over the GOTP plane by plane. By arranging the groups in descending order of Atom magnitude and descending order of expected occurrence of particular bases, an embedded code may be achieved which may account for the variable rates of occurrence of bases efficiently. It has been found that, in one embodiment this may work best where the number of MERGE groups is not such a large number so that the bit rate cost of the symbols that distinguish the groups is not prohibitive. Positive and negative signs S are equally probable, so S may be sent as one bit of side information to reduce the number of groups.

Information about the child Atoms for a group of parents may be coded at the end of a MERGE scan. Each atom in the MERGE group is a parent, and the status of the child Atoms may be signaled in the order that the parent Atoms were sent. The parent list 718 is scanned three times, for each possible child position in the GOTP, with the coder and decoder both aware of the possible planes according to the GOTP position of the parent, as shown below.

The signs S and ΔFSB of child Atoms are formed into a code giving the run length of similar atoms as shown below and sent by a variable length code (VLC) static code. It has been found experimentally that the atom replication scheme may be optimized if ΔFSB is restricted to values 0, 1 and 2 plus the Null condition.

| S | ΔFSB | RL | ... |
|---|------|----|----|

Although one embodiment of a method for coding the replicated Atoms has been described, there may be many other methods of the replicated Atoms, without straying from the concepts disclosed herein.

The various blocks and units of coding system 700 may be implemented using software, firmware, and/or hardware, or any combination of software, firmware, and hardware. Further, although FIG. 7 depicts an example system having a particular configuration of components, other embodiments are possible using other configurations. Also, although example system 700 includes motion estimation with the wavelet transformation and matching pursuits processing, other embodiments are possible with different transforms.

Figure 8:
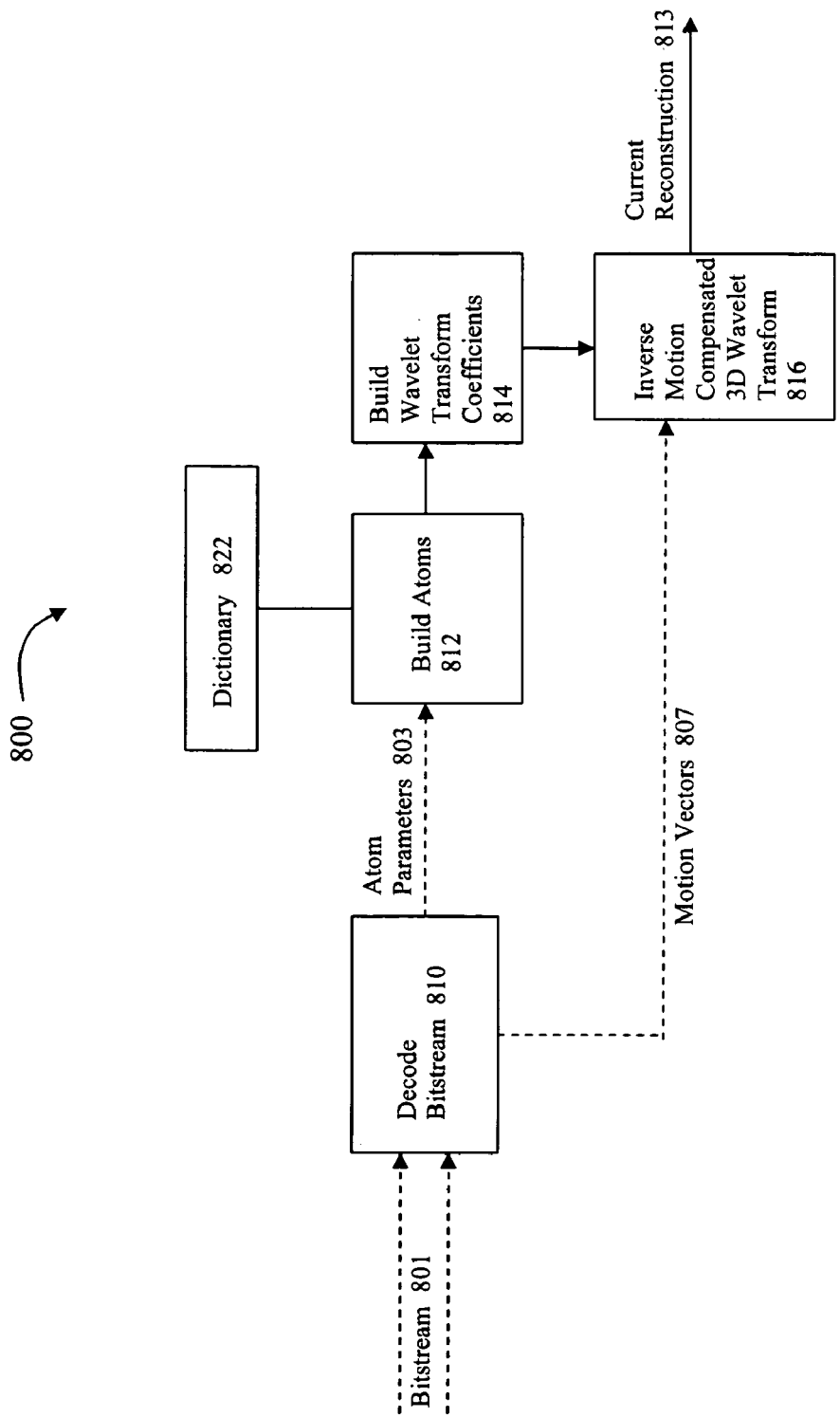
FIG. 8 is a block diagram of an embodiment of an example decoding system.

FIG. 8 is a block diagram of one embodiment of an example decoding system 800. Decoding system 800 may be included in any of a wide range of electronic devices, including cellular phones, computer systems, or other image viewing devices, although the claimed subject matter is not limited in this respect. A decode bitstream block 810 may receive a bitstream 801, which may comprise coded motion vector information as well as coded Atom parameters from a matching pursuit operation. Decode bitstream block 810 may parse bitstream 801 into various components, and provide decoded Atom parameters 803 to a build Atoms block 812, and also provide decoded motion vectors 807 to an inverse motion compensated 3D wavelet transform block 816.

Build Atoms block 812 receives coded Atom parameters 803 and provides decoded Atom parameters to a build wavelet transform coefficients block 814. Block 814 uses the Atom parameter information and dictionary 822 to reconstruct a series of wavelet transform coefficients.

The coefficients may be then delivered to an inverse motion compensated 3D wavelet transform block 816. The coefficient data and motion vectors 807 may be utilized to create a current reconstruction 813, by inverse motion compensated 3D wavelet transform block 816.

The various blocks and units of decoding system 800 may be implemented using software, firmware, and/or hardware, or any combination of software, firmware, and hardware. Further, although FIG. 8 depicts an example system having a particular arrangement of components, other embodiments are possible using other arrangements. Also, although example system 800 includes motion compensation processing, other embodiments are possible without motion compensation.

Figure 9:
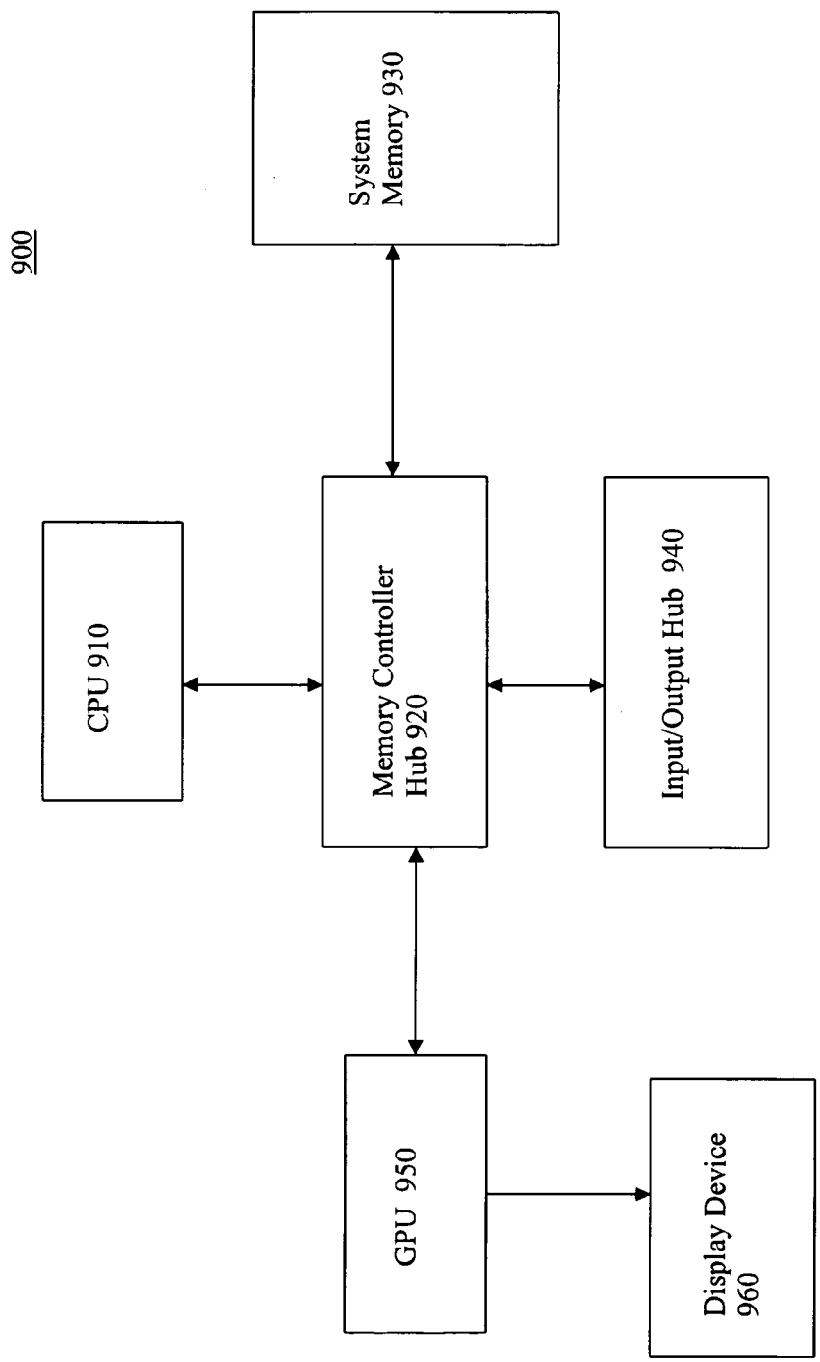
FIG. 9 is a block diagram of an embodiment of an example system on which the methods may be implemented.

FIG. 9 is a block diagram of an example computer system 900. System 900 may be used to perform some or all of the various functions discussed above in connection with FIGS. 1-8. System 900 includes a central processing unit (CPU) 910 and a memory controller hub 920 coupled to CPU 910. Memory controller hub 920 is further coupled to a system memory 930, to a graphics processing unit (GPU) 950, and to an input/output hub 940. GPU 950 is further coupled to a display device 960, which may comprise a CRT display, a flat panel LCD display, or other type of display device. Although example system 900 is shown with a particular arrangement of components, other embodiments are possible using any of a wide range of arrangements.

Some portions of the detailed description are presented in terms of processes, programs and/or symbolic representations of operations on data bits and/or binary digital signals within a computer memory, for example. These processes descriptions and/or representations may include techniques used in the data processing arts to convey the arrangement of a computer system and/or other information handling system to operate according to such programs, processes, and/or symbolic representations of operations.

A process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, these and/or similar terms may be associated with the appropriate physical quantities, and are merely convenient labels applied to these quantities.

Unless specifically stated otherwise, as apparent from the following discussions, throughout the specification discussion utilizing terms such as processing, computing, calculating, determining, and/or the like, refer to the action and/or processes of a computing platform such as computer and/or computing system, and/or similar electronic computing device, that manipulate and/or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include one or more apparatuses for performing the operations herein. Such an apparatus may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device, computing platform, and/or other information handling system.

The processes and/or displays presented herein are not necessarily limited to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

In the description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore the term "and/or" may mean "and", it may mean "or", it may mean "exclusive-or", it may mean "one", it may mean "some, but not all", and/or it may mean "both."

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

In the foregoing specification claimed subject matter has been described with reference to specific example embodiments thereof. It will, however, be evident that various modifications and/or changes may be made thereto without departing from the broader spirit and/or scope of the subject matter as set forth in the appended claims. The specification and/or drawings are, accordingly, to be regarded in an illustrative rather than in a restrictive sense.

What is claimed is:

1. A method, performed by a computing system having a memory and a processor, for coding data, the method comprising:
    applying a motion compensated transform to an original image sequence;
    creating motion vectors and temporal planes during the motion compensated transform; and
    performing, by the computing system, a replicated matching pursuit process on the motion compensated transformed image sequence at least in part by,
        identifying a parent atom at a first location within a first temporal plane of the created temporal planes, the parent atom having an associated first basis function; and
        for each of a plurality of second temporal planes of the created temporal planes,
            identifying a second location of a potential child atom within the second temporal plane, wherein the second location within the second temporal plane is substantially identical in position to the first location within the first temporal plane;
            determining, based at least in part on the first basis function and the identified second location, an amplitude; and
            upon determining that the determined amplitude exceeds a first threshold, storing the potential child atom as a child atom of the second temporal plane.

2. The method of claim 1, wherein the motion compensated transform is three dimensional.

3. The method of claim 1, wherein the motion compensated transformed image sequence comprises a group of temporal planes.

4. The method of claim 3, wherein the group of temporal planes comprises 16 planes.

5. The method of claim 4, wherein the motion compensated transform comprises performing 1 or more spatial scales, and 1 or more scales of 2 or more temporal wavelet transforms.

6. The method of claim 1, wherein the replicated matching pursuit process is applied to the temporal planes to create matching pursuits coded data.

7. The method of claim 6, further comprising:
    coding the motion vectors;
    coding the matching pursuits coded data; and transmitting the coded motion vectors and the coded matching pursuits coded data.

8. The method of claim 7, wherein the coding the motion vectors comprises variable length coding.

9. The method of claim 7, wherein the coding the matching pursuits coded data comprises precision limited quantization coding.

10. The method of claim 7, wherein the coding the matching pursuits coded data comprises merge coding.

11. The method of claim 7, wherein coding the matching pursuits coded data comprises run length coding.

12. The method of claim 7, further comprising:
receiving the coded motion vectors and coded matching pursuits data;
decoding the received data; and
reconstructing a current reconstruction image sequence utilizing the decoded data.

13. The method of claim 1, wherein the data comprises multidimensional data.

14. A method, performed by a computing system, of transforming data, comprising:
parsing received data wherein the received data was coded by applying a motion compensated transform to an original image, creating motion vectors and temporal planes during the motion compensated transform, and performing, by the computing system, a replicated matching pursuit process on the motion compensated transformed image sequence including,
identifying a first atom at a first location within a first temporal plane using a matching pursuit process on the first temporal plane of the created temporal planes, the first atom having an associated first basis function, and
for each of a plurality of second temporal planes of the created temporal planes,
identifying a second location of a potential child atom within the second temporal plane, wherein the second location within the second temporal plane is substantially identical in position to the first location within the first temporal plane,
determining, based at least in part on the first basis function and the identified second location, an amplitude, and
upon determining that the determined amplitude exceeds a first threshold, storing the potential child atom as a child atom of the second temporal plane;
creating motion compensation data from the parsed data;
building parent and similar atoms, and residual data from the parsed data;
building wavelet transform coefficients;
producing motion residual image utilizing an inverse wavelet transform; and
merging the motion compensation data and the motion residual image to form a current reconstruction image.

15. A tangible computer-readable storage medium having computer-executable instructions stored thereon, the instructions comprising:
instructions to apply a three-dimensional motion compensated transform to an image sequence, wherein the motion compensated transform comprises creating motion vectors and temporal planes; and
instructions to perform a replicated matching pursuit process on the transformed image sequence including,
determining a parent atom in a first temporal plane of the created temporal planes, wherein the parent atom is at a first location within the first temporal plane of the created temporal planes and has an associated first basis function, and
for each of a plurality of second temporal planes of the created temporal planes,
determining a second location of a potential child atom within the second temporal plane, wherein the second location within the second temporal plane is substantially identical in position to the first location within the first temporal plane,
determining, based at least in part on the first basis function and the identified second location, an amplitude, and
upon determining that the determined amplitude exceeds a first threshold, storing the potential child atom as a child atom of the second temporal plane.

16. The tangible computer-readable storage medium of claim 15, wherein the instructions to perform the replicated matching pursuit process include instructions for applying the replicated matching pursuit process to the temporal planes to create matching pursuits coded data.

17. The tangible computer-readable storage medium of claim 16, further comprising:
instructions to code the motion vectors;
instructions to code the matching pursuits coded data; and
instructions to transmit the coded motion vectors and the coded matching pursuits data.

18. The tangible computer-readable storage medium of claim 17, further comprising:
instructions for receiving the coded motion vectors and coded matching pursuits data;
instructions for decoding the received data; and
instructions for reconstructing a current reconstruction image sequence utilizing the decoded data.

19. The tangible computer-readable storage medium of claim 15, wherein the data comprises multidimensional data.

20. A system for transforming data, comprising:
means for processing program instructions communicably coupled to a means for storing in a memory;
means for applying a three-dimensional motion compensated transform to an image sequence and creating motion vectors and temporal planes during the motion compensated transform; and
means for performing a replicated matching pursuit process on the transformed image sequence including,
determining a parent atom in a first temporal plane of the created temporal planes, wherein the parent atom is at a first location within the first temporal plane of the created temporal planes and has an associated first basis function, and
for each of a plurality of second temporal planes of the created temporal planes,
determining a second location of a potential child atom within the second temporal plane, wherein the second location within the second temporal plane is substantially identical in position to the first location within the first temporal plane,
determining, based at least in part on the first basis function and the identified second location, an amplitude, and
upon determining that the determined amplitude exceeds a first threshold, storing the potential child atom as a child atom of the second temporal plane.

21. The system of claim 20, wherein the motion compensated transformed image sequence comprises a group of temporal planes.

22. The system of claim 21, wherein the group of temporal planes comprises 16 planes.

23. The system of claim 22, wherein the motion compensated transform comprises performing 1 or more spatial scales, and 1 or more scales of 2 or more temporal wavelet transforms.

24. The system of claim 20, wherein the matching pursuit process is applied to the temporal planes to create matching pursuits coded data.

25. The system of claim 24, further comprising:

means for coding the motion vectors;

means for coding the matching pursuits coded data; and means for transmitting the coded motion vectors and the coded matching pursuits coded data.

* * * * *